United States Patent Office 3,361,719
Patented Jan. 2, 1968

3,361,719
VULCANIZATION AGENTS
Harald Blümel, Otto Wiechulla, and Walter Reuter, Marl, Germany, assignors to Chemische Werke Huls Aktiengesellschaft, Marl, Germany
No Drawing. Filed Jan. 22, 1964, Ser. No. 339,337
Claims priority, application Germany, Feb. 6, 1963, C 29,102
6 Claims. (Cl. 260—66)

This invention relates to elastomer technology, particularly to vulcanization agents.

It is known that for the vulcanization of elastomers, so-called vulcanization agents are used. These vulcanization agents are substances which by themselves or in combination with other substances will effect a transition of elastomers from the non-crosslinked into the cross-linked condition. For this purpose sulfur in its various forms is generally used, but use can also be made of selenium, tellurium, polysulfides and corresponding compounds of selenium and tellurium, polynitroso-compounds, quinone derivatives, metal oxides or mixtures of metal oxides such as zinc oxide, magnesium oxide, lead oxide, calcium oxides, etc.

The known vulcanization accelerators can also be designated as vulcanization agents. The mode of operation of these vulvanization accelerators is that without themselves causing any cross-linking, they cooperate with other vulcanization agents to speed up the vulcanization and to produce improved products. Vulcanization accelerators occur in many different classes of chemical compounds and are generally used in combination with sulfur, metal oxides, fatty acids and other substances commonly present in vulcanizable mixtures. Known accelerators are e.g. various substituted amines, quanidine, toluidine, aniline derivatives, thiuramsulfide, thiazole, dithiocarbaminate, sulfenamide, peroxides metal compounds of these substances, and corresponding compounds of selenium and tellurium The principal object of this invention is to provide new vulcanization agents.

Other objects are to provide a process of vulcanization as well as vulcanized and vulcanizable compositions based on the new vulcanization agents.

Upon further study of the specification and claims other objects and advantages of the present invention will become apparent.

To attain the objects of this invention it has been found that ketone-disulfides of the formulas

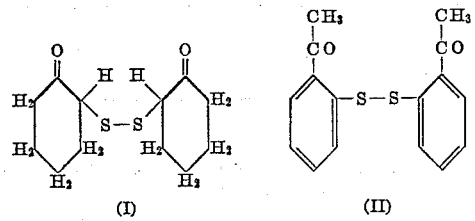

can be advantageously used as vulcanization agents in vulcanizable mixtures. Not only the dicyclohexanone-disulfide, di-acetophenone-disulfide can be used, but also their alkyl-, aryl- or aralkyl-substitued derivatives, e.g. the disulfides of methyl-, ethyl- and butyl-acetophenone, phenyl-acetophenone, methyl-phenyl-acetophenone; the disulfides of methyl-cyclohexanone, cyclohexyl-cyclohexanone, methyl-phenylcyclohexanone.

The ketone-disulfides are obtainable by the reaction of 1 to 2 mols of a disulfur-dichloride with 2 mols of a ketone. For the preparation of di-acetophenone-disulfide 1 mol acetophenone was reacted with 1 mol disulfur-dichloride at a temperature of 20° C. Providing a further reaction the mixture was heated to about 100° C., then the resulting product was treated with carbon tetrachloride to separate retained sulfur.

Dicyclohexanone-disulfide was obtained by reacting 2 mols cyclohexanone with 1 mol disulfur-dichloride at a temperature of 0° to 10° C. for one hour. For further reaction the mixture was held at 30° C. for 3 hours, then poured into benzene to remove present hydrochloric acid and finally washed with diluted aqueous alkali hydroxide solution and water.

Relatively small amounts of the material are used, generally from 0.05 to 20%, and preferably 0.1 to 10% based on the weight of the elastomers.

Suitable vulcanizable elastomeric mixtures comprise e.g. natural rubber and synthetic rubber-like vulcanizable elastomers such as butadiene-styrene polymers, butadiene-acrylonitrile copolymers, polychloroprene, polybutadiene, polyisoprene, butyl-rubber, ethylene-propylene copolymers in saturated or unsaturated form, halogenated or halosulfonated polyethylene, these types of polymers being classified as sulfur-vulcanizable rubbers for the purpose of this invention. In addition to the rubber base, there can be included fillers such as active or inactive carbon black, active or inactive silicic acid, silicates, carbonates, sulfates, materials to impart resistance to light crazing, fatigue or ageing, and also waxes, fatty acids, plasticizing oils, coloring materials and vulcanization agents.

These mixtures are masticated in the machines that are generally employed in the rubber industry, such as internal mixers (Banbury) and rubber mills. The basic mixtures are generally produced at higher temperatures than the final mixtures which consist of the basic mixtures with vulcanizing agents added thereto to produce cross linking.

The advantage of said vulcanizing agents consists in that they are operable in extremely small concentrations as compared to other vulcanizing agents. Therefore the vulcanizing agents according to the present invention involve a highly economic production of elastomeric mixtures.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

*Example 1*

In an internal mixer of 2 liter net volume operated at 40 r.p.m. and at 50° C., by means of heat transfer fluid, the following mixture is produced—

100 parts cold rubber type 1500, specifically a copolymer obtained by copolymerization of 23 parts styrene and 77 parts butadiene in an emulsifier containing aqueous emulsion at 5° C. ("Type 1500" refer to ASTM, Rubber World, 1960, page 107)
47.5 parts HAF carbon black
8 parts aromatic plasticizer oil
1 part N-phenyl-N'-cyclohexyl-p-phenylene diamine
1 part ozocerite The materials are mixed 10 minutes. The above-mentioned vulcanization agents are then mixed therewith on a laboratory rubber mill. This method of mixing and also the basic composition given above are used in all the following examples.

The ring and plate shaped samples for testing which were obtained by vulcanization at 150° C. in a press and subsequent stamping out had the following properties as defined by the German standardization regulations.

TABLE I

| Mixture | Parts, per 100 parts of rubber | Ingredients in addition to those listed in Example 1 | Heating time in min. | Tensile Strength, kg./cm.² | Expansion, percent | Modulus, kg./cm.² | | Perm. expansion, percent | Resistance to tearg., kg./cm. | Hardness, ° Shore | Elasticity | |
|---|---|---|---|---|---|---|---|---|---|---|---|---|
| | | | | | | 300 percent | 500 percent | | | | 22° C., percent | 75° C., percent |
| 1 | 2 5 | Sulfur, Dicyclohexanone-disulfide. | 15'A 30'B 60'C 120'D | 10 66 178 206 | 865 985 755 550 | 6 16 42 83 | 10 35 103 182 | 100 63 26 14 | 2 10 21 18 | 41 49 54 59 | 40 41 43 43 | 33 38 44 49 |
| 2 | 5 2 5 | ZnO, Sulfur, Dicyclohexanone-disulfide. | 15'A 30'B 60'C 120'D | 192 224 242 237 | 735 665 600 540 | 49 68 86 103 | 113 154 191 216 | 26 20 18 15 | 22 21 18 17 | 57 60 60 61 | 39 39 40 40 | 45 48 51 52 |
| 3 | 5 | Dicyclohexanone-disulfide. | 15'A 30'B 60'C 120'D | 6 16 59 125 | 760 1,030 910 820 | 6 6 16 28 | 6 13 35 68 | 100 100 65 41 | 1 3 10 16 | 40 45 50 50 | 40 41 42 43 | 32 34 38 42 |

The preceding table shows that mixture number 3 is vulcanized to a significant degree without the addition of any other vulcanizing agents except the novel agent of this invention.

*Example 2*

As the following table shows, a change in the amount of the dicyclohexanone-disulfide to below 0.5 part per 100 parts of rubber has only a very slight effect on the properties of the product. Even if the amount is reduced to 0.25 part per 100 parts of rubber, the product is still useful.

TABLE II

| Mixture | Parts, per 100 parts of rubber | Ingredients in addition to those listed in Example 1 | Heating time in min. | Tensile Strength, kg./cm.² | Expansion, Percent | Modulus, kg./cm.² | | Perm. Expansion, Percent | Resistance to tearg., kg./cm. | Hardness, ° Shore | Elasticity 22° C., Percent |
|---|---|---|---|---|---|---|---|---|---|---|---|
| | | | | | | 300 Percent | 500 Percent | | | | |
| 1 | 5 2 0.25 | ZnO, Sulfur, Dicyclohexanonedisulfide. | 15'A 30'B 60'C 120'D | 108 141 173 224 | 955 725 620 630 | 22 37 57 73 | 51 88 130 166 | 65 33 23 21 | 14 17 17 14 | 52 56 56 57 | 40 40 39 39 |
| 2 | 5 2 0.5 | ZnO, Sulfur, Dicyclohexanonedisulfide. | 15'A 30'B 60'C 120'D | 115 173 192 223 | 910 815 670 635 | 24 40 58 77 | 59 94 132 168 | 50 27 25 20 | 15 16 15 15 | 53 55 57 59 | 39 40 39 39 |
| 3 | 5 2 1 | ZnO, Sulfur, Dicyclohexanonedisulfide. | 15'A 30'B 60'C 120'D | 151 172 205 224 | 890 715 670 610 | 31 47 64 82 | 73 106 140 175 | 44 27 17 19 | 18 19 17 14 | 54 56 58 60 | 39 40 39 39 |
| 4 | 5 2 2 | ZnO, Sulfur, Dicyclohexanonedisulfide. | 15'A 30'B 60'C 120'D | 171 206 225 243 | 810 725 655 605 | 41 57 74 92 | 94 130 163 194 | 34 26 20 18 | 17 17 15 14 | 56 57 59 61 | 40 40 40 39 |
| 5 | 5 2 5 | ZnO, Sulfur, Dicyclohexanonedisulfide. | 15'A 30'B 60'C 120'D | 196 201 194 240 | 795 650 545 585 | 47 68 81 97 | 106 146 175 200 | 30 20 14 16 | 20 19 17 16 | 57 59 61 62 | 39 39 39 39 |

Results similar to the preceding examples are obtained by replacing the cold rubber of Example 1 with natural rubber or any synthetic rubber-like vulcanizable elastomer such as those hereinbefore mentioned.

Similarly, the examples can be repeated successfully using the other generically and specifically described novel vulcanizing agents of this invention such as diacetophenone-disulfide, the disulfides of methyl-, ethyl- and butyl-acetophenone, phenyl-acetophenone, methyl-phenyl-acetophenone; the disulfides of methyl-cyclohexanone, cyclohexyl-cyclohexanone, methyl-phenyl-cyclohexanone.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process of vulcanizing rubber of the group consisting of natural rubber, butadiene-styrene copolymers, butadiene - acrylonitrile copolymers, polychloroprene, polybutadiene, polyisoprene, butyl-rubber, ethylene-propylene copolymers, halogenated polyethylene, and halosulfonated polyethylene, the improvement which comprises employing as a vulcanization agent 0.05–20% by weight based on the weight of the rubber, of a compound selected from the group consisting of dicyclohexanone-disulfide, diacetophenone-disulfide, di-(lower alkyl) acetophenone-disulfide, diphenylacetophenone-disulfide, di-(methylphenylacetophenone)-disulfide, di-(methyl-cyclohexanone) - disulfide, di-(cyclohexyl-cyclohexanone)-disulfide, and di-(methyl-phenylcyclohexanone)-disulfide.

2. The process of claim 1, wherein the vulcanizing agent is dicyclohexanone-disulfide.

3. The process of claim 1, wherein the vulcanizing agent is diacetophenone-disulfide.

4. An unvulcanized composition comprising a predominant amount of a rubber selected from the group consisting of natural rubber, butadiene-styrene copolymers, butadiene-acrylonitrile copolymers, polychloroprene, polybutadiene, polyisoprene, butyl-rubber, ethylene-propylene copolymers, halogenated polyethylene, and halo-sulfonated polyethylene and 0.2–20% based on the weight of the rubber of a compound selected from the group consisting of di-cyclohexanone-disulfide, diacetophenone-disulfide, di-(lower alkyl) acetophenone-disulfide, diphenylacetophenone-disulfide, di-(methylphenylacetophenone) - disulfide, di-(methyl-cyclohexanone)-disulfide, di-(cyclohexyl-cyclohexanone)-disulfide, and di-(methyl-phenylcyclohexanone)-disulfide.

5. The composition of claim 4, wherein the compound is dicyclohexanone-disulfide.

6. The composition of claim 4, wherein the compound is diacetophenone-disulfide.

References Cited

UNITED STATES PATENTS 3,296,308   1/1967   Walker et al. _ _ _ _ _ _   260—79.5

OTHER REFERENCES

Chemical Abstracts, June 1962, vol. 56; 15330H.

Milligan et al.: Chem. Soc. Jour., 1961, pt. 4 (pp. 4269–5564), p. 5552 relied on.

Walker et al.: Jour. Org. Chem., vol. 28, September–December 1963, p. 3080.

JOSEPH L. SCHOFER, *Primary Examiner*.

DANIEL K. DENENBERG, *Assistant Examiner*.